US010008007B2

(12) United States Patent
Taubin et al.

(10) Patent No.: US 10,008,007 B2
(45) Date of Patent: Jun. 26, 2018

(54) METHOD FOR GENERATING AN ARRAY OF 3-D POINTS

(71) Applicant: Brown University, Providence, RI (US)

(72) Inventors: Gabriel Taubin, Providence, RI (US); Daniel Moreno, Providence, RI (US)

(73) Assignee: Brown University, Providence, RI (US)

( * ) Notice: Subject to any disclaimer, the term of this patent is extended or adjusted under 35 U.S.C. 154(b) by 28 days.

(21) Appl. No.: 14/031,711

(22) Filed: Sep. 19, 2013

(65) Prior Publication Data

US 2014/0078260 A1   Mar. 20, 2014

Related U.S. Application Data

(60) Provisional application No. 61/703,520, filed on Sep. 20, 2012.

(51) Int. Cl.
  H04N 13/02      (2006.01)
  G06T 7/80       (2017.01)
  G06T 7/521      (2017.01)

(52) U.S. Cl.
  CPC ............ *G06T 7/80* (2017.01); *G06T 7/521* (2017.01); *G06T 7/85* (2017.01); *H04N 13/0246* (2013.01); *G06T 2207/30244* (2013.01)

(58) Field of Classification Search
  CPC .......... G06T 2207/30244; G06T 7/002; G06T 7/0057; H04N 13/0246; H04N 13/02
  USPC ....................................................... 348/46
  See application file for complete search history.

(56) References Cited

U.S. PATENT DOCUMENTS

| | | | |
|---|---|---|---|
| 6,373,963 B1* | 4/2002 | Demers | G01B 11/2527 108/100 |
| 6,503,195 B1* | 1/2003 | Keller | A61B 1/00163 348/45 |
| 9,063,548 B1* | 6/2015 | Ferguson | G05D 1/0231 |
| 9,081,385 B1* | 7/2015 | Ferguson | G06K 9/00798 |
| 9,227,323 B1* | 1/2016 | Konolige | B25J 9/163 |
| 9,414,048 B2* | 8/2016 | Karsch | H04N 13/026 |
| 2002/0048396 A1* | 4/2002 | Bewley, Jr. | B44B 1/006 382/154 |
| 2002/0050988 A1* | 5/2002 | Petrov | G06K 9/20 345/418 |
| 2002/0180726 A1* | 12/2002 | Shi | G06F 3/033 345/418 |

(Continued)

OTHER PUBLICATIONS

Remondino et al, Image-Based 3D Modeling: A review, Sep. 2006.*
Dai et al, Head pose estimation by imperceptible structured light sensing, May 9-13, 2011.*

*Primary Examiner* — Shan E Elahi
(74) *Attorney, Agent, or Firm* — Wolf, Greenfield & Sacks, P.C.

(57) ABSTRACT

A method that estimates the coordinates of the calibration points in the projector image plane using local homographies obtained from the imaging camera. First, a dense set of correspondences between projector and camera pixels is found by projecting onto the calibration object an identical pattern sequence as the one later projected when scanning the target, reusing most of the software components written for the scanning application. Second, the set of correspondences is used to compute a group of local homographies that allow projection back of any of the points in the calibration object onto the projector image plane with sub-pixel precision. In the end, the data projector is then calibrated as a normal camera.

5 Claims, 5 Drawing Sheets

(56) References Cited

U.S. PATENT DOCUMENTS

| | | | |
|---|---|---|---|
| 2003/0025788 A1* | 2/2003 | Beardsley | G06T 7/0042 348/43 |
| 2003/0122780 A1* | 7/2003 | Hendriks | G06F 3/03542 345/156 |
| 2003/0174880 A1* | 9/2003 | Sakamoto | G01L 11/25 382/154 |
| 2004/0005092 A1* | 1/2004 | Tomasi | G01B 11/25 382/154 |
| 2004/0155965 A1* | 8/2004 | Jaynes | H04N 5/74 348/189 |
| 2009/0059011 A1* | 3/2009 | Sun | G01B 11/2504 348/187 |
| 2009/0238449 A1* | 9/2009 | Zhang | G01B 11/2536 382/165 |
| 2010/0085425 A1* | 4/2010 | Tan | H04N 9/3194 348/54 |
| 2010/0123784 A1* | 5/2010 | Ding | H04N 9/3191 348/189 |
| 2010/0125356 A1* | 5/2010 | Shkolnik et al. | 700/98 |
| 2010/0177164 A1* | 7/2010 | Zalevsky et al. | 348/46 |
| 2011/0033887 A1* | 2/2011 | Fang | B01L 3/502707 435/41 |
| 2011/0187832 A1* | 8/2011 | Yoshida | A63F 13/02 348/46 |
| 2012/0106846 A1* | 5/2012 | Fourre et al. | 382/186 |
| 2012/0169842 A1* | 7/2012 | Chuang et al. | 348/39 |
| 2012/0242806 A1* | 9/2012 | Ibrahim | H04N 13/02 348/47 |
| 2013/0147911 A1* | 6/2013 | Karsch | H04N 13/026 348/43 |
| 2013/0276542 A1* | 10/2013 | Herzog | G01H 9/00 73/655 |
| 2013/0279920 A1* | 10/2013 | Herzog | G02B 6/36 398/212 |
| 2013/0281819 A1* | 10/2013 | Schmid | A61B 5/0095 600/407 |
| 2013/0296683 A1* | 11/2013 | Herzog | A61B 5/0095 600/407 |
| 2013/0296684 A1* | 11/2013 | Miller | A61B 5/0095 600/407 |
| 2013/0296701 A1* | 11/2013 | Zalev | A61B 5/0095 600/440 |
| 2014/0043329 A1 | 2/2014 | Wang et al. | |
| 2014/0172377 A1 | 6/2014 | Taubin et al. | |
| 2014/0247326 A1* | 9/2014 | Hebert | H04N 13/0275 348/46 |
| 2015/0016712 A1 | 1/2015 | Rhoads et al. | |

* cited by examiner

METHOD FOR GENERATING AN ARRAY OF 3-D POINTS

CROSS-REFERENCE TO RELATED APPLICATIONS

This application is related to and claims priority from earlier filed U.S. Provisional Patent Application No. 61/703,520, filed Sep. 20, 2012.

GOVERNMENT LICENSE RIGHTS

This invention was made with government support under Grants IIS-0808718 and CCF-0915661 awarded by the National Science Foundation. The government has certain rights in the invention.

BACKGROUND OF THE INVENTION

The present invention relates generally to computer implemented system and algorithm for generating a surface from an array of points that have been captured from photographs. More specifically, the present invention relates to a system that generates a highly accurate array of points that can then be used as an effective and accurate tool for surface feature generation and matching in a wide range of applications.

It is well known in the art that there are many tools available for digitizing a three dimensional surface profile. Laser scanner systems, for example, can generate highly accurate surface measurements and 3-D models. The difficulty, however, is that laser scanner systems are prohibitively expensive and require substantial time to process a three dimensional object. Other rendering systems that employ multi-view stereo algorithms generate dense point clouds simply create an array of points that from a computer perspective are disjointed relative to one another. This makes it difficult to near impossible to generate a surface from such a point set. Instead, when the surface is rendered, each point is simply rendered as a disk that is large enough to overlap the adjacent point in a manner that provides the appearance of a surface.

Due to the cost and time investment required in the art in obtaining the array of points, structured-light systems are the preferred choice for do-it yourself 3D scanning applications. They are easy to deploy, only an off-the-shelf data projector and camera are required. Further, they are very accurate when implemented carefully. A projector-camera pair works as a stereo system, with the advantage that a properly chosen projected pattern simplifies the task of finding point correspondences. In such systems, projectors are modeled as inverse cameras and all considerations known for passive stereo systems may be applied with almost no change. However, the calibration procedure must be adapted to the fact that projectors cannot directly measure the pixel coordinates of 3D points projected onto the projector image plane as cameras do. Viewpoint, zoom, focus, and other parameters ought to be adjusted, both in projector and camera, to match each target object size and scanning distance; invalidating any previous calibration. Therefore, structured-light systems must first be calibrated before each use in order to guarantee the best result. As a result, the simplicity of the calibration procedure becomes as valuable as its precision.

Many projector calibration procedures exist, however, none of the available methods are easy for the common user to perform. Further, they generally require high precision to enable accurate 3D reconstructions. Several methods use a pre-calibrated camera to find world coordinates in some calibration artifact, which in turn they use to assign projector correspondences. These methods might be simple to perform, but all of them lack of accuracy in the projector parameters due to their dependence on the camera calibration. The inaccuracies are a direct consequence of their approach: even small camera calibration errors could result into large world coordinate errors. Their failure point is in estimating the projector parameters from the, far from accurate, world coordinates decreasing the complete system precision.

A different approach employs movement of the projector to several locations so that the calibration pattern, projected onto a fixed plane, changes its shape. However, moving the projector is generally inconvenient or impossible (e.g. a system mounted on a rig). Moreover, these methods are not applicable if a metric reconstruction is mandatory because their result is only up-to-scale.

Other proposed algorithms employ a projected pattern that is iteratively adjusted until it overlaps a printed pattern. The overlap is measured with help of an un-calibrated camera. Since both patterns must be clearly identified, the classic black and white pattern is replaced by color versions of it, making color camera mandatory. In practice, switching to color patterns makes color calibration unavoidable as printed and camera colors seldom match, thereby imposing an extra requirement to the user.

Another common practice among projector calibration methods is to find one homography transformation between a calibration plane and the projector image plane. Despite the elegance of the concept, they cannot model non-linear distortions as the ones introduced by projector lenses.

Some methods claim to get very accurate results by projecting patterns on a flat aluminum board mounted on a high precision moving mechanism. However, such a special equipment is not available to the common user, limiting its general applicability. We disregard this method as non-practical. While others employ structured-light patterns to create new synthetic images from the projector's viewpoint and feed them to standard camera calibration tools. The intermediate step of creating synthetic images at the projector's resolution, usually low, might discard important information.

There is therefore a need for a method and system for inexpensively and reliably generating a complete and accurate array of 3-D points from photographs. There is a further need for a method and system that generates an accurate set of 3-D points for further use in surface representation that can be employed for feature matching relative to a database of known surfaces.

BRIEF SUMMARY OF THE INVENTION

In this regard, the present invention provides generally for a method that estimates the coordinates of the calibration points in the projector image plane using local homographies obtained from the imaging camera. First, a dense set of correspondences between projector and camera pixels is found by projecting onto the calibration object an identical pattern sequence as the one later projected when scanning the target, reusing most of the software components written for the scanning application. Second, the set of correspondences is used to compute a group of local homographies that allow projection back of any of the points in the calibration object onto the projector image plane with sub-pixel precision. In the end, the data projector is then calibrated as a normal camera.

Principally the present method focuses on finding correspondences between the projector pixels and real 3D world points. Once those correspondences are known, any calibration technique available for passive stereo can be applied directly to the structured-light system. Since the present method does not rely on the camera calibration parameters to find the set of correspondences, the projector calibration is not affected in any way by the accuracy of the camera calibration.

The disclosed calibration method can be implemented in such a way that no user intervention is necessary after data acquisition, making the procedure effective even for inexperienced users. Concisely, then the calibration software requires two actions:

1) Project a sequence of gray code patterns onto a static planar checkerboard placed within the working volume. Capture one image for each projected pattern and store each of the captured images in one location. Repeat this step for several checkerboard positions within the imaging field until properly cover all the working volume. Use a separate storage location for each of the captured image sequences.

2) Execute the calibration software and select the directory containing all the sequences. Enter the checkerboard dimensions. Click on "Calibrate" button. The software will automatically decode all the sequences, find corner locations, and calibrate both projector and camera. The final calibration will be saved to a file for later use.

It is therefore an object of the present invention to provide a method and system for inexpensively and reliably generating a complete and accurate array of 3-D points from a photograph. It is a further object of the present invention to provide a method and system that generates an accurate set of 3-D points that can be further used in a surface representation that can be employed for feature matching relative to a database of known surfaces.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

The present invention provides generally for a method that estimates the coordinates of the calibration points in the projector image plane using local homographies obtained from the imaging camera. First, a dense set of correspondences between projector and camera pixels is found by projecting onto the calibration object an identical pattern sequence as the one later projected when scanning the target, reusing most of the software components written for the scanning application. Second, the set of correspondences is used to compute a group of local homographies that allow projection back of any of the points in the calibration object onto the projector image plane with sub-pixel precision. In the end, the data projector is then calibrated as a normal camera.

Principally the present method focuses on finding correspondences between the projector pixels and real 3D world points. Once those correspondences are known, any calibration technique available for passive stereo can be applied directly to the structured-light system. Since the present method does not rely on the camera calibration parameters to find the set of correspondences, the projector calibration is not affected in any way by the accuracy of the camera calibration.

Figure 1:
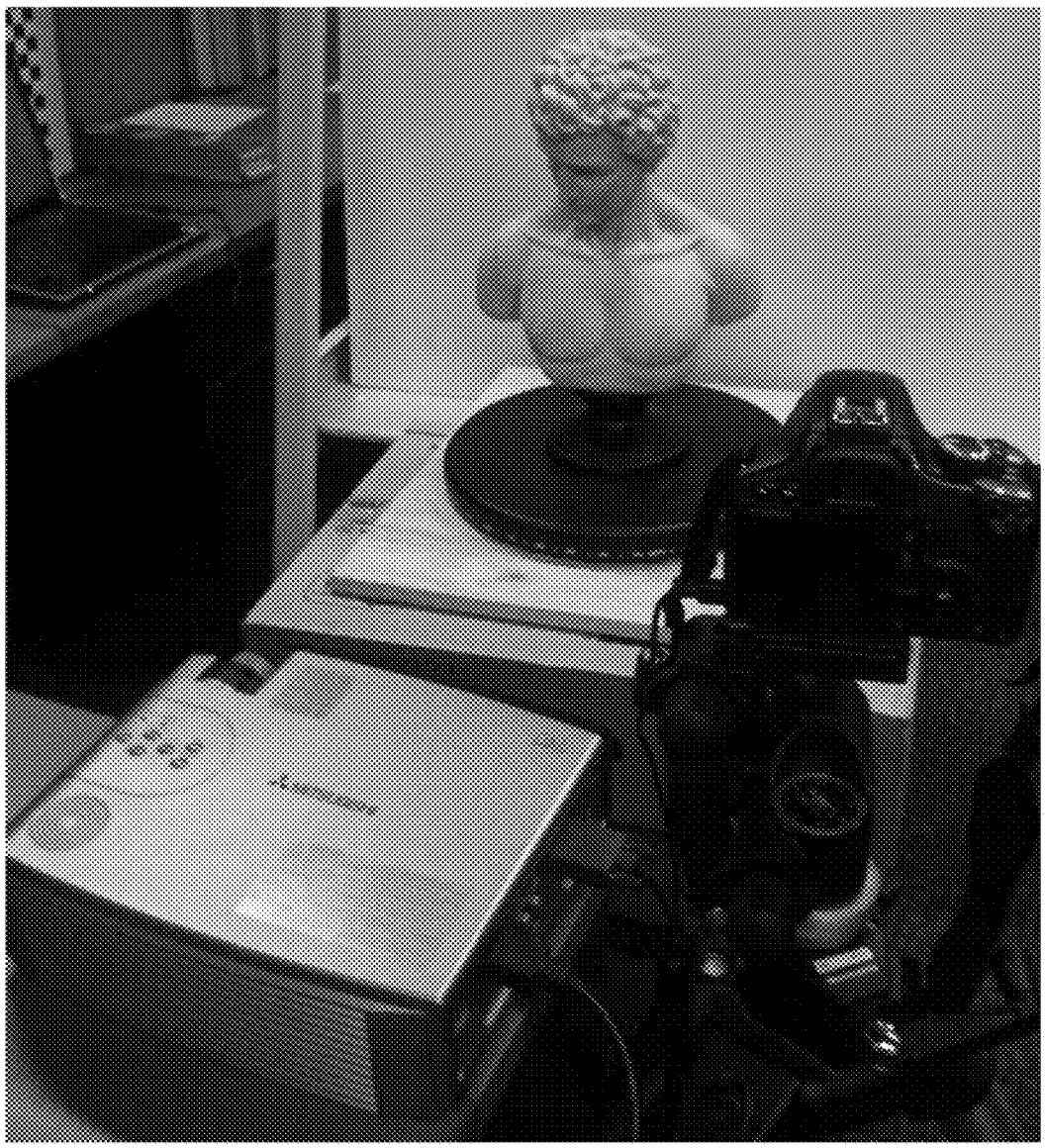
FIG. 1 is an illustration of a camera projector arrangement in accordance with the present invention.
Figure 2:
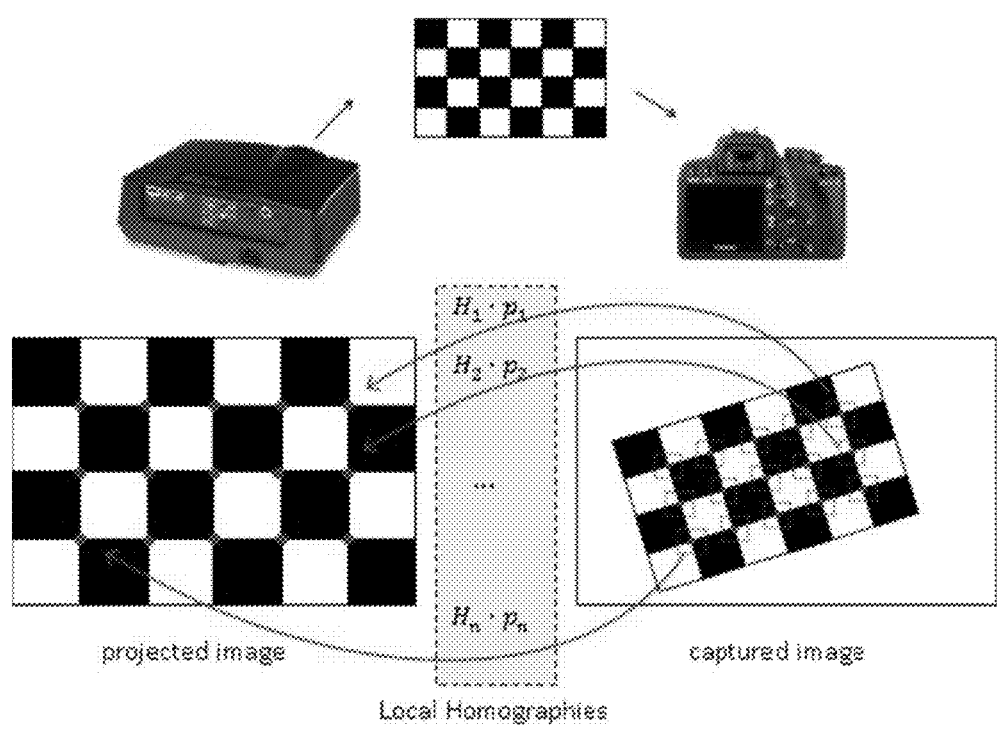
FIG. 2 is a diagram representing an overview of the calibration process.

As seen at FIG. 1, the setup of the present invention comprises one projector and one camera behaving as a stereo pair. We describe them both using the pinhole model extended with radial and tangential distortion, creating an advantage over prior art methods which fail to compensate for distortions in the projected patterns. Depicted at FIG. 2, the system uses an imaging plane as a calibration artifact. While FIG. 2 depicts a checkerboard pattern, the imaging plane could take many configurations provided the imaging plane contains an array of identifiable points distributed through the plane which can be identify and locate precisely in the images. Camera calibration involves collecting images of the planar checkerboard.

Figure 3:
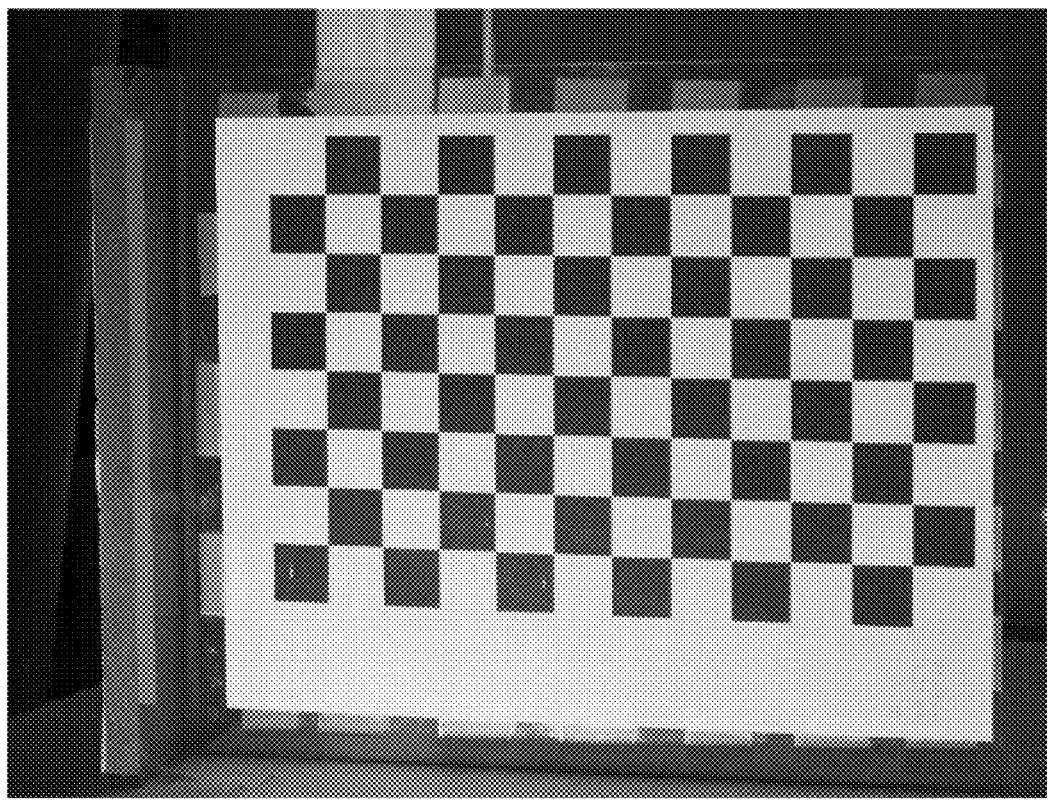
FIG. 3 is a fully illuminated image of a checkerboard target for use in the calibration process.
Figure 4:
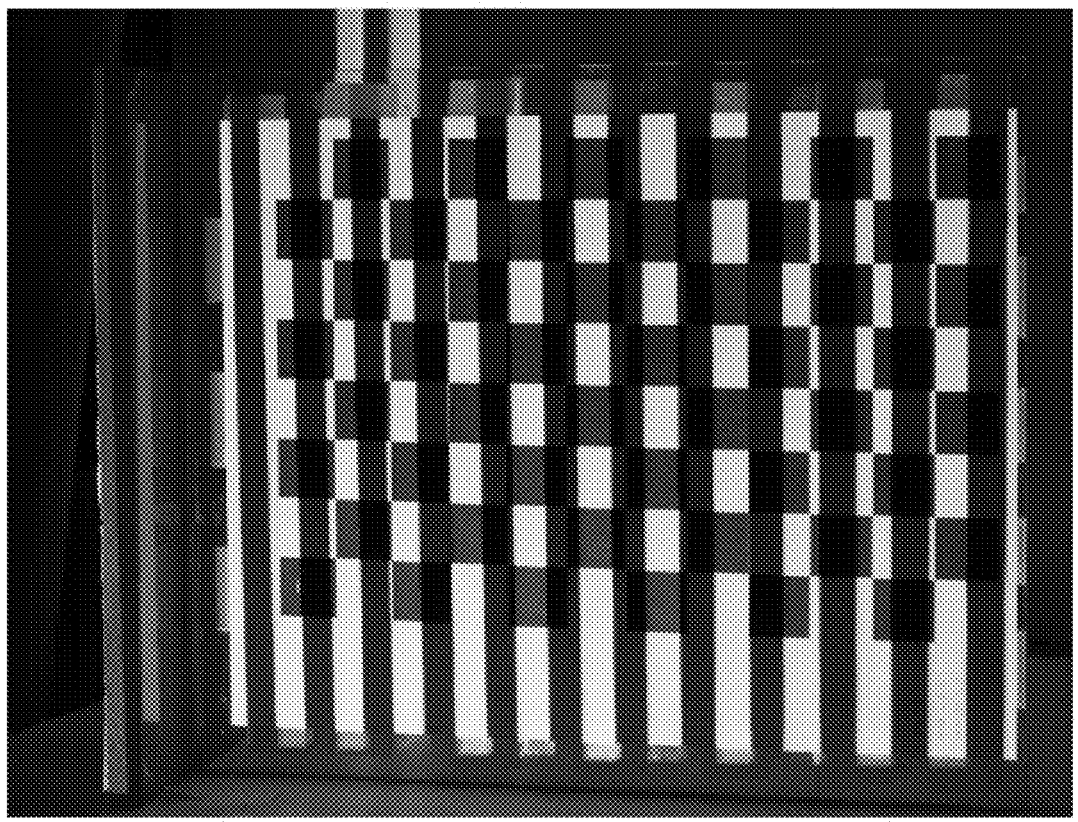
FIG. 4 is a structured illuminated image of a checkerboard target for use in the calibration process.

The acquisition step is tailored to make it possible to calibrate both camera and projector. The data acquisition of the present invention requires that, for each plane orientation, instead of capturing only one image, the user must project and capture a complete structured-light pattern sequence. First a fully illuminated image as shown at FIG. 3 and then a structured lighting pattern as shown by example at FIG. 4. Although any structured-light pattern sequence would work, we have used and recommend gray code sequences because they are robust to decoding errors in a calibration routine avoiding all possible errors usually outweighs execution speed. The user captures images of a checkerboard of known dimensions at several orientations and the algorithm calculates the camera calibration parameters using the relation between the checkerboard corners in a camera coordinate system and a world coordinate system attached to the checkerboard plane.

Intrinsic camera calibration refers to estimating the parameters in the chosen camera model. In the camera calibration, the present invention finds the coordinates in the camera image plane of all the checkerboard corners, for each of the captured checkerboard orientations. Corner locations are sought in a completely illuminated image, of each checkerboard orientation, using a standard procedure. A completely illuminated image is an image captured while all data projector pixels are turned on. If no such image is available, it could be created as a composite combining the maximum illumination regions of every image in the structured illumination sequence. The procedure then automatically finds the checkerboard corner locations and refines them to reach sub-pixel precision. Finally, a call to the function calibrateCamera( ) returns the calibrated camera parameters.

While in the present invention the projector and camera are described with the same mathematical model, the projector is not a camera and therefore cannot capture images from its own viewpoint, in order to search checkerboard corners itself. However, we develop a known relation between projector and camera pixels that is extracted from structured-light sequences. It is this known relationship that is used to estimate checkerboard corner locations in terms of projector pixel coordinates. Moreover, since all the computations are carried out at the camera's original resolution, corner coordinates are localized with greater precision than if synthetic images at the projector's resolution were used.

Figure 5:
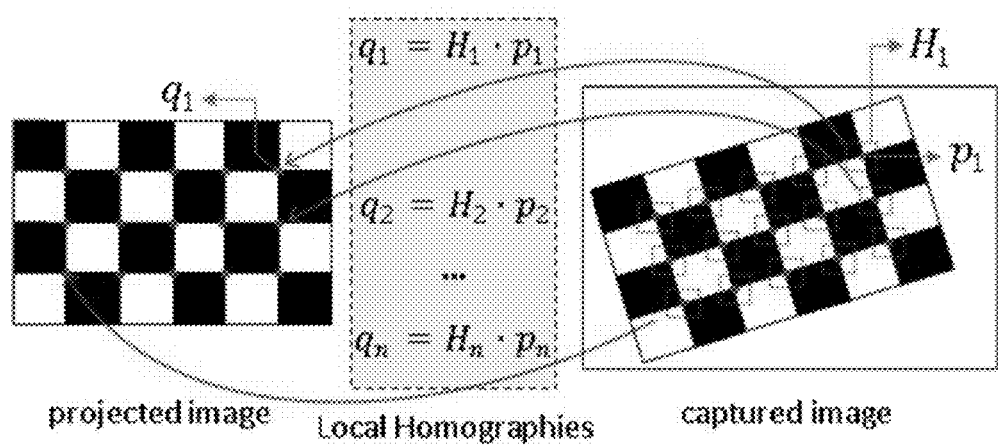
FIG. 5 is an illustration of the use of homographies for mapping projector pixels to camera pixels to complete the calibration.

The procedure to compute checkerboard corner coordinates in the projector coordinate system can be decomposed in three steps. First, the structured-light sequence is decoded and every camera pixel is associated with a projector row and column, or set to "uncertain". As seen at FIG. 5, a local homography is estimated for each checkerboard corner in the camera image. Finally, each of the corners is converted (FIG. 4) from camera coordinates to projector coordinates applying the local homography that was just created. The structured-light decoding step depends on the projected pattern, in our case complementary gray codes for rows and columns.

Ideally, the amount of light perceived at each camera pixel is product of exactly one projector pixel being turned on or off, but in practice this is rarely true. The intensity value reported by the camera at one pixel is the sum of the amount of light emitted by a projector pixel, called direct component, plus some amount of light, known as global component, originated at other sources (including reflections from other projector pixels). Decoding errors in gray sequences are mostly caused by failure on identifying these components, or completely ignoring their existence. To enhance the accuracy of the precision of the calibration and image capture an additional step may optionally be added wherein the light is broken into its component sources. In this manner, through the use of robust pixel classification, each component of the pixel illumination is correctly identified and separated into its component part thereby allowing a simple set of rules that permits a drastic reduction in decoding errors.

The relation learned from structured-light patterns is not bijective as it cannot be used right away to translate from camera to projector coordinates. To overcome this issue we us the concept of local homography, a homography that is valid only in a region of the plane. Instead of applying a single global homography to translate all the checkerboard corners into projector coordinates, we find one local homography for each of the checkerboard corners. Each local homography is estimated within a small neighborhood of the target corner and is valid only to translate that corner into projector coordinates and no other corner. Local homographies allow to model non-linear distortions because each corner is translated independently of the others. Additionally, they are robust to small decoding errors because they are over determined in that they are estimated from a neighborhood with more points than the minimum required. A local homography is found for each checkerboard corner considering all the correctly decoded points in a patch of the camera image centered at the corner location. The same strategy is repeated until all checkerboard corners have been translated. Now, knowing the location of all corners in the projector coordinate system, the projector intrinsic calibration is found with identical procedure as for the camera.

Given the intrinsic calibration of the camera and the projector, the stereo system then must be calibrated. Stereo calibration means finding the relative rotation and translation between projector and camera. At this point, the intrinsic parameters found before are kept fixed, the world coordinates are identified using camera coordinates, and we need to determine the projector pixel positions in world coordinates. The physical dimensions of the calibration checkerboard are known. The checkerboard corner projections onto both camera and projector image planes are also known. The calibration of the projector-camera stereo system, therefore, is identical to the calibration of any other camera-camera system. Our system operates a stereo calibrate function using the previously found checkerboard corner coordinates and their projections to produce a rotation matrix R and a translation vector T relating the projector-camera pair.

The complete calibration procedure can be summarized in simple steps and implemented as a calibration algorithm:

1) Detect checkerboard corner locations for each plane orientation in the completely illuminated images.

2) Decode structured-light patterns into projector row and column correspondences. To reduce decoding errors, optionally estimating global and direct light components for each set using gray code high frequency patterns and using robust pixel classification to determine pixel global and direct components.

3) Take small image patches centered at the checkerboard corner coordinates from step 1 (e.g. a 47×47 pixels square) and use all the correctly decoded pixels in each patch to compute a local homography that converts from camera to projector coordinates. Correspondences were obtained in step 3.

4) Translate corner locations (step 1) from camera to projector coordinates using patch local homographies from step 4.

5) Fix a world coordinate system to the checkerboard plane and find camera intrinsics using camera corner locations from step 1.

6) Fix a world coordinate system to the checkerboard plane and find projector intrinsics using projector corner locations from step 5.

7) Fix camera and projector intrinsics (steps 6 and 7) and use world, camera, and projector corner locations (steps 1 and 5) to estimate stereo extrinsic parameters.

8) Optionally, all the parameters, intrinsic and extrinsic, can be bundle-adjusted together to minimize the total re-projection error.

One of the main advantages of the method of the present invention is that it allows the model to account for radial and tangential distortion in projector lenses the same as in cameras. This is important since projector lenses have noticeable distortion, especially near the edges. The complete distortion model (FIG. 7) shows that points close to the top-left corner are displaced about 12 pixels from their ideal non-distorted coordinates and at the bottom-center of the projected image, where its principal point is located, there is no distortion as expected. In conclusion, data projectors have non-trivial lens distortions that cannot be ignored.

Accordingly it can be seen that the present invention provides a new method to calibrate projector/camera systems that is simple to implement and more accurate than previous methods because it uses a full pinhole model, including radial and tangential lens distortions, to describe both projector and camera behaviors and computes sub-pixel resolution 3D point projections from un-calibrated camera images. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A stereo system comprising:
 a calibration object having known dimensions and a plurality of points having known relationships to one another and that are identifiable in images of the object;
 a projector configured to project a sequence of structured-light patterns that code corresponding projector coordinates in the structured-light patterns;
 a camera to capture a plurality of images of the object at each of a plurality of orientations of the object with the object being illuminated by the sequence of structured-light patterns at each of the plurality of orientations; and
 a computer having a storage medium for storing the plurality of images and at least one processor configured to:
  identify each of the plurality of points in each of the plurality of images and determine a camera coordinate for each of the plurality of points identified in the plurality of images;
  automatically determine projector coordinates for each of a plurality of pixels in each of the plurality of image from the structured light patterns in each of the plurality of images;
  compute a local homography for each point identified in the plurality of images, each local homography determined from the projector coordinates determined from pixels in a neighborhood of the respective point identified in the plurality of images, each local homography providing a local transformation from camera coordinates to projector coordinates;
  transform the camera coordinate of each point identified in the plurality of images to a respective projector coordinate using the corresponding local homography;
  determine intrinsic camera parameters using the known dimensions of the object and the determined camera coordinates of each of the plurality of points identified in the plurality of images;
  determine intrinsic projector parameters using the known dimensions of the object and the projector coordinates transformed from the respective camera coordinates by the respective local homography; and
  determine a transformation that relates locations of the camera and the projector to calibrate the projector-camera pair of the stereo system.

2. The system of claim 1, wherein the sequence of structured-light patterns comprise binary patterns.

3. The system of claim 1, wherein the sequence of structured-light patterns comprise Gray codes.

4. The system of claim 1, wherein the sequence of structured-light patterns comprise phase shifting patterns.

5. The system of claim 1, wherein the calibration object comprises a checkerboard of known dimensions and wherein the plurality of points are corners of said checkerboard.

* * * * *